United States Patent Office 3,367,893
Patented Feb. 6, 1968

3,367,893
PROCESS FOR THE PREPARATION OF ACTIVATED POLYAMIDE MODIFIED POLYMERS
Lothar Halbartschlager, Vienna, Austria, assignor to Reichhold Chemicals Inc., Detroit, Mich.
No Drawing. Filed June 7, 1962, Ser. No. 200,630
6 Claims. (Cl. 260—8)

The invention relates to a process for the preparation of new modified homo- or copolymers and resulting product.

Various processes have already been proposed for modifying latices of butadiene, acrylonitrile, acrylic esters and styrene in the form of homo- or copolymers obtained from two or more monomers, and the products resulting from such processes, depending upon the type of modification, are known to possess properties that makes them suitable for various purposes.

Copolymers obtained by emulsion polymerization and modified in the aforesaid manner have already been successfully used in the field of plastic binders.

Examples of previously known modifications are:

(1) Copolymers of the above mentioned composition can be cross-linked with colloidal sulfur or zinc dibutyldithiocarbamate. Instead of zinc dibutyldithiocarbamate it is possible to use mercaptobenzothiazole or benzothiazyl-disulfide or tetramethylthiuram-disulfide.

(2) Cross-linking of copolymers of the aforesaid composition with trimethylolmelamine or dimethylolurea by the catalytic action of sodium aluminate.

(3) Cross-linking of copolymers of the aforesaid composition with zinc oxide.

(4) Mechanical mixtures of copolymers of the aforesaid composition with natural polyamides for increasing the ketone and ester stability.

Products modified in accordance with these methods are used in the form of aqueous emulsions as plastic binders having unusual properties; however, they still have a few drawbacks in some fields of application.

For example, it is not possible to obtain therewith dry films that are completely ketone- and ester-stable. Moreover, the cold breaking resistance as well as the heat resistance of the dry films obtained from such emulsions did not meet some of the requirements. The surprising discovery has now been made that it is possible to arrive at excellent ketone- and ester-stable products the films of which fully meet the requirements also from the standpoint of cold breaking resistance if the polymers or copolymers of two or more monomers selected from the group consisting of butadiene, acrylonitrile, acrylic acid, acrylic esters and styrene, are cross-linked with a polyamide.

The process according to the present invention is distinguished in that it is relatively easy to carry out and that the products obtained thereby have properties not found in the previously prepared ones. It is necessary that the polymers be derived from one or more of the following monomers which have groups that are free or are capable of being activated and which can undergo reaction with amide groups, as for example acrylonitrile, acrylic esters, acrylic acid and the corresponding methacrylic compounds. Other monomers can be used together with these, such as styrene, butadiene, vinyl acetate or vinyl propionate.

It is advantageous to use polyamides that contain at least partially chain-like structural elements. As polyamides it is possible to use both the synthetic and the natural ones. Examples are milk casein and soya protein. The polyamides used, depending upon their origin and the selection of the polymer, can be applied in the form of commercial products or it may be necessary to first convert them to a reactive form, i.e. with a view to activating them for the reaction with the polymers. Such a conversion, when necessary, may be carried out in several ways depending upon the type of product; for example in an acid or alkaline medium, at normal or raised temperatures.

The amount of polyamide used in the reaction is normally 5 to 90% based upon the solids content of the polymer to be modified, preferably between 20 and 50%. The process, according to a specific case, can be carried out by first saponifying the copolymer and separately converting, or rather decomposing, the polyamide, whereupon the two solutions are combined, while stirring, at raised temperature.

The increasing of the temperature is carried out to about boiling heat. However, it is also possible to stir the polyamide in a dry condition into the solution or emulsion of the polymer, preferably at raised temperature and thereafter heat the mixture to boiling temperature. In both these cases it has been found advantageous to hold the pH value higher than 7, for example by the addition of amines. The amines considered particularly useful in this respect are morpholine, 2-methyl-2-aminopropanol-1, trimethylamine, dimethylamine, ethylene triamine, triethylene-tetramine, cyclic organic amines, water-soluble organic amines and polyamines.

The solutions or emulsions prepared in accordance with the present invention have an extremely high stirring stability. It is practically impossible to coagulate them by rubbing, for example when they are mechanically applied as films. The surface tension is greatly reduced in the finished product so that a very efficient bond is obtained between the dry film and the surface in the course of processing. The resistance against the influence of heat is very high while the elasticity of the system remains unchanged. These properties are not obtained by the use of simple homopolymers or copolymers of the aforesaid composition or a mechanical mixture of the above mentioned polymers and polyamides. Although it is possible, by the use of mechanical mixtures of polymers of the aforesaid composition with polyamides having partial or complete chain-like structures, to obtain for example an increase in the heat resistance of the dry film, this is accompanied by a severe embrittlement of the system.

In summary, it can be said that the outstanding elasticity, cold breaking resistance, heat resistance, ketone and ester stability of the products obtained in accordance with the present invention, are properties all of which could not be obtained with heretofore known products.

The following examples serve to explain the invention and are intended to be illustrative only and not limitative:

EXAMPLE 1

500 gr. of a copolymer of butadiene-acrylonitrile-acrylic acid in the form of an emulsion copolymer (40% solids content, spec. weight 1, viscosity as per Brookfield viscosimeter LVF spindle 1 12 P, particle size 1200 A, is heated while stirring to 80° C., whereupon a solution of 10 gr. of morpholine in 60 gr. of water (dist.) is slowly added. After this there is added, while stirring, a solution made up of 10 gr. of soya protein in 100 gr. of water and 10 gr. of morpholine. The whole mixture is heated for four hours to 90° C. and is then quickly cooled while still stirring.

EXAMPLE 2

400 gr. of a copolymer of butadiene-acrylonitrile in the form of an emulsion copolymer (solids content 40%, viscosity as per Brookfield viscosimeter LVF spindle 1 70 cP, average particle size 500 angstrom, known in commerce as Breon Nitrile Latex 1561, are heated to 95° C., while stirring, and while slowly adding 50 gr. of a 20% solution of 2-methyl-1-amino-propanol, and maintained at this temperature for three hours while still stirring. 10 gr. of dry milk casein are slowly sprinkled into the solution, whereupon additional 100 gr. of water and 6 gr. of 2-methyl-2-amino-propanol-1 are added and another 5 gr. of casein are sprinkled into the mixture. The whole is then kept at a temperature of 75° C., while constantly stirring, for four hours, after which it is cooled while still stirring.

EXAMPLE 3

660 gr. of an emulsion copolymer of butadiene-acrylonitrile-acrylic acid are slowly heated to 70° C. while stirring. 20 gr. of morpholine are then dissolved in 128 gr. of water and slowly added as the temperature is kept 70 to 80° C. for two additional hours. 150 gr. of a 20% solution of a water-soluble synthetic polyamide in water (pH value 7.5, viscosity cP, density 1,252) are then added, while constantly stirring, and the temperature is raised to 85 to 90° C. After two hours, cooling is initiated while still stirring.

Properties of the polymers cross-linked with polyamide:

Average values

| | | |
|---|---|---|
| Resistance to wet rubbing | Previously max. 4 | New products 5. |
| Resistance to dry rubbing | Previously max. 3 | New products 4. |
| Acetone stability | Previously max. 2 | New products 4–5. |
| Heat resistance | Previously max. 180° C | New products 250° C. |
| Cold stability | Previously max. −10° C | New products −15° C. |
| Breaking stress | | New products 380%. |
| Permanent elongation | Previously 55% | New products 0%. |
| Flexometer test | Previously 10,000–20,000 | New products 120,000. |

For comparative test purposes there have been used copolymers based upon acrylates per se as well as those of butadiene-acrylate basis obtained from European and U.S. manufacturers.

Valuation key:
(1) Unsatisfactory
(2) Satisfactory
(3) Good
(4) Very good
(5) Outstanding.

The invention has been described in detail for the purpose of illustration but it will be obvious to those skilled in the art that numerous modifications and variations may be resorted to without departing from the invention as defined in the accompanying claims.

I claim:
1. A process for the preparation of a modified polymer comprising (A) a polymer of at least two monomers (1) one comprising at least one member selected from a group consisting of acrylic and methacrylic acids and (2) the other consisting of at least one vinyl derivative selected from a group consisting of butadiene, styrene, vinyl acetate and vinyl propionate, which method comprises reacting and cross linking said polymer with a polyamide containing at least partially chain-like structural elements, said modified polymer being suitable for the manufacture of products having the properties of elasticity, cold breaking resistance, heat resistance and ketone and ester stability, the polymer being first partially saponified and then cross-linked with a natural polyamide which has been subjected to activating treatment, the polyamide being activated by treatment with a nitrogen-containing base.

2. A process for the preparation of a modified polymer comprising (A) a polymer of at least two monomers (1) one comprising at least one member selected from a group consisting of acrylic and methacrylic acids and (2) the other consisting of at least one vinyl derivative selected from a group consisting of butadiene, styrene, vinyl acetate and vinyl propionate, which method comprises reacting and cross linking said polymer with a polyamide containing at least partially chain-like structural elements, said modified polymer being suitable for the manufacture of products having the properties of elasticity, cold breaking resistance, heat resistance and ketone and ester stability, the polymer being first partially saponified and then cross-linked with a natural polyamide which has been subjected to activating treatment, the activating treatment of the natural polyamides being carried out with water and amines at a temperature between 20 and 90° C., for a period of from about twenty minutes to one and one-half hours.

3. A process for the preparation of a modified polymer comprising (A) a polymer of at least two monomers (1) one comprising at least one member selected from a group consisting of acrylic and methacrylic acids and (2) the other consisting of at least one vinyl derivative selected from a group consisting of butadiene, styrene, vinyl acetate and vinyl propionate, which method comprises reacting and cross linking said polymer with a polyamide containing at least partially chain-like structural elements, said modified polymer being suitable for the manufacture of products having the properties of elasticity, cold breaking resistance, heat resistance and ketone and ester stability, the reaction being carried out in a solution of a partially saponified polymer combined at a temperature of from about 80 to 88° C., while stirring, with an aqueous solution of a polyamide treated with an amine.

4. Process according to claim 3, wherein the reaction is carried out at a pH value of more than 7.

5. Process according to claim 3, wherein the reaction is carried out at a pH value of more than 7, which is obtained by the addition of amines.

6. A process for the preparation of a modified polymer comprising (A) a polymer of at least two monomers (1) one comprising at least one member selected from a group consisting of acrylic and methacrylic acids and (2) the other consisting of at least one vinyl derivative selected from a group consisting of butadiene, styrene, vinyl acetate and vinyl propionate, which method comprises reacting and cross linking said polymer with a polyamide containing at least partially chain-like structural elements, said modified polymer being suitable for the manufacture of products having the properties of elasticity, cold breaking resistance, heat resistance and ketone and ester stability, at least one member of a group consisting of morpholine, 2-methyl-2-amino propanol-1, trimethylamine, dimethylamine, ethylenetriamine, triethylenetetramine, cyclic organic amines and polyamines being used.

References Cited

UNITED STATES PATENTS

| 2,548,520 | 4/1951 | Damschroder et al. | 260—8 |
| 3,027,336 | 3/1962 | Gotz et al. | 260—8 |
| 2,772,166 | 11/1956 | Fowler | 260—8 |

FOREIGN PATENTS 487,056    6/1938    Great Britain.

WILLIAM H. SHORT, *Primary Examiner.*

L. J. BERCOVITZ, *Examiner.*

J. ZIEGLER, J. NORRIS, *Assistant Examiners.*